No. 754,504. Patented March 15, 1904.

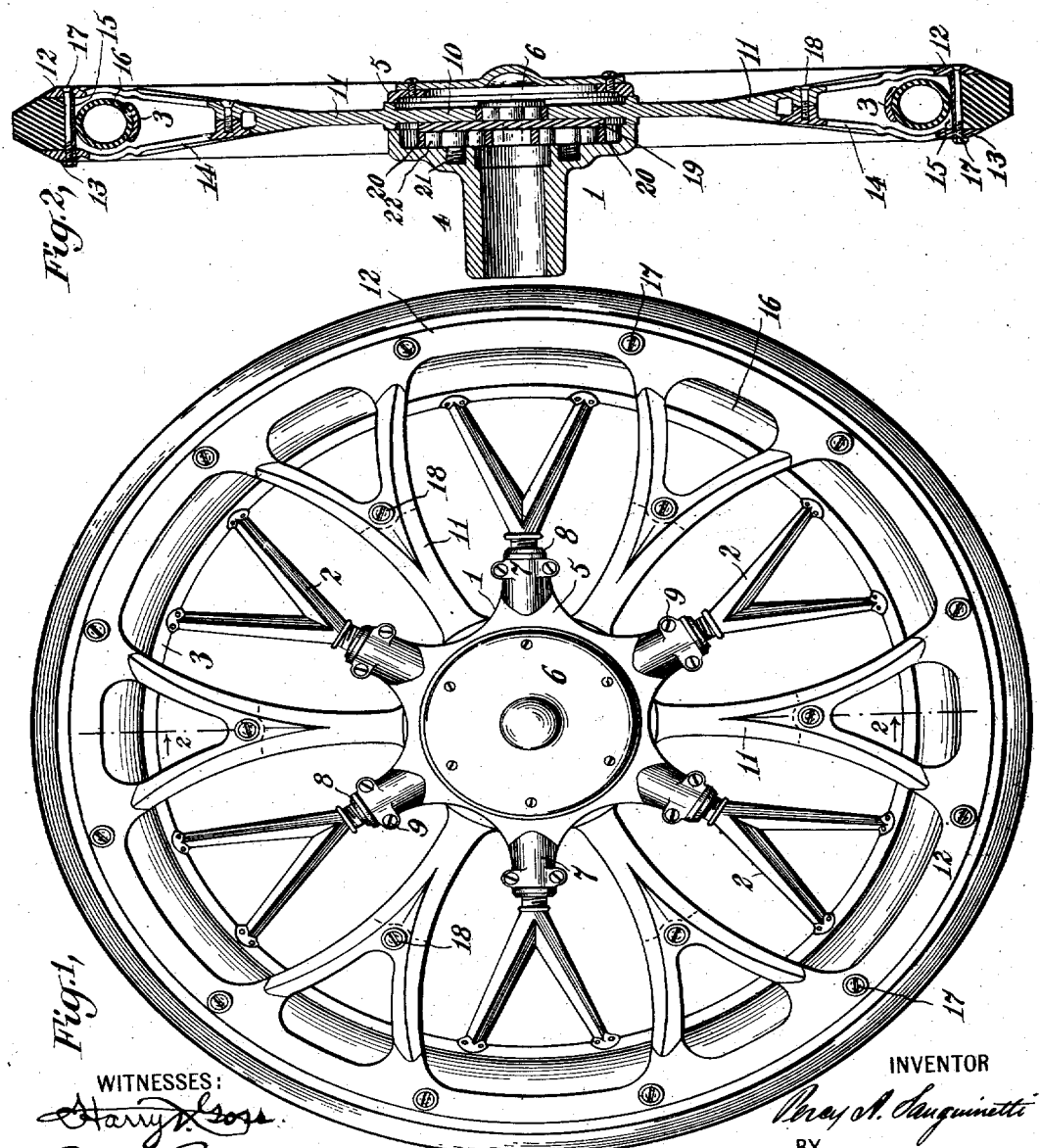

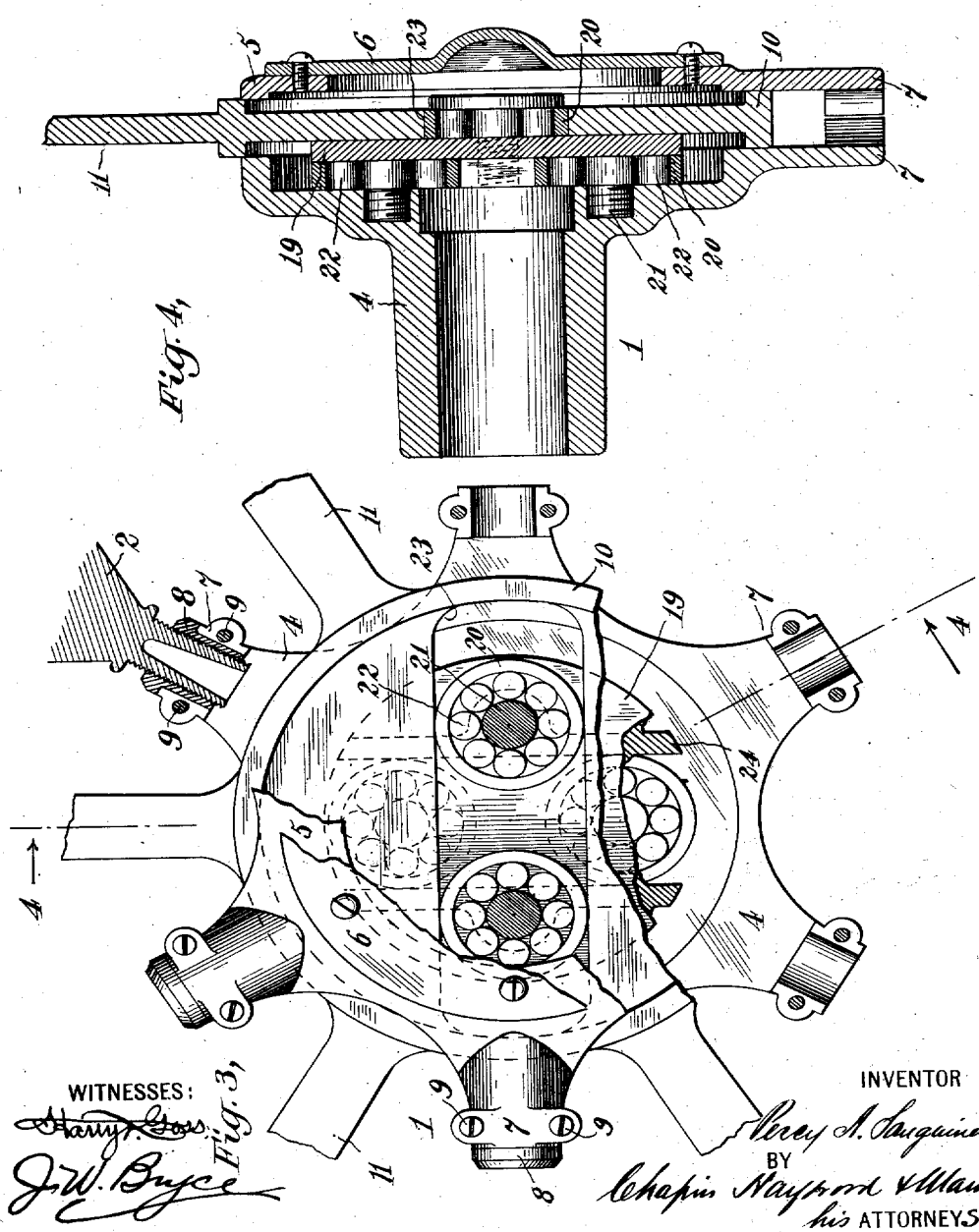

UNITED STATES PATENT OFFICE.

PERCY A. SANGUINETTI, OF NEW YORK, N. Y., ASSIGNOR TO ADA E. MARTINSEN, OF NEW YORK, N. Y.

VEHICLE-WHEEL.

SPECIFICATION forming part of Letters Patent No. 754,504, dated March 15, 1904.

Application filed November 4, 1902. Serial No. 130,016. (No model.)

*To all whom it may concern:*

Be it known that I, PERCY A. SANGUINETTI, a citizen of the United States of America, and a resident of New York city, county and State of New York, have invented certain new and useful Improvements in Vehicle-Wheels, of which the following is a specification, reference being had to the accompanying drawings, forming a part thereof.

My invention relates to vehicle-wheels, and particularly to that class of vehicle-wheels described and claimed in United States Letters Patent No. 672,908 of April 30, 1901, and United States Letters Patent No. 700,514 of May 20, 1902.

My invention consists in forming a central floating plate, the spokes radiating therefrom, and one of the flanges of the outer channel separate from the tread or tire of a single integral portion; in forming the rim portion of the outer channel separate from the flanges which coact therewith to support the outer tire or tread and constitute the side supports thereof and rigidly securing the parts together; in an improved method of connecting the short spokes which support the inner rim to the hub and in providing means for adjustment thereof, and in the provision of roller-bearings between the hub, the floating plate, and the intermediate guide-plate.

The objects of my invention are to simplify and improve the construction and arrangement of parts in the type of wheel set forth in the above-mentioned patents, to provide for varying widths of outer tread, to provide for adjustment of the inner spokes, and to reduce friction of the parts within the hub.

My invention further consists in certain novel details of construction and combination of parts, as will hereinafter be more fully set forth.

I will now proceed to describe, with reference to the accompanying drawings, a vehicle-wheel embodying my invention, and will then point out the novel features in claims.

In the drawings, Figure 1 shows a face view of the vehicle-wheel embodying my invention. Fig. 2 shows a vertical transverse section therethrough, the section being taken upon the plane of the line 2 2 of Fig. 1. Fig. 3 is an enlarged view of the hub portion of the wheel with certain parts broken away and other parts in section. Fig. 4 shows an enlarged transverse section of the parts of the wheel shown in Fig. 3, the section being taken upon the plane of the line 4 4 of Fig. 3.

A vehicle-wheel of this description comprises two members, one a hub member and the other a tire member, and a cushioning device arranged between the two members so that undue shocks to which the wheel may be subjected will be taken up at a point intermediate the hub and the tread of the wheel. Means are further provided in this type of wheel for locking the two wheel members against relative rotation while permitting otherwise free relative movement of the members in the plane of rotation of the wheel.

The improved wheel comprises two members in accordance with the foregoing, one including the hub, and hence termed the "hub member," and the other including the tire or tread and termed the "tire member."

The hub member comprises a hub 1, adapted to be mounted on the axle of a vehicle, a plurality of spokes 2, radiating from the hub 1, and the inner rim 3, secured to the outer ends of the spokes 2. The hub member is composed of a main hub portion 4, a complementary portion 5, and a dust-cup 6. The portions 4 and 5 have corresponding radial projections 7 7, to which are fitted centrally-screw-threaded bushings 8. The inner ends of the spokes 2 are screw-threaded and are fitted to the bushings 8, as will be seen more particularly by reference to Fig. 3 of the drawings. By turning the bushings 8 the spokes 2 may be adjusted as desired. When the spokes 2 have been properly adjusted they may be locked in their positions by means of bolts or screws 9, which engage ears of the radial projections 7.

The tire member comprises a central floating plate 10, suitably arranged within the hub and between the hub portions 4 and 5, a plurality of spokes 11 radiating therefrom, a flange 12, integral with said spokes, another flange 13, integral with removable portions 14 of the spokes 11, and an outer rim 15. Certain portions 14 of the spokes 11 are made removable, together with the aforesaid flange 13, in order that access may be obtained when desired to the inner rim 3 and to a cushioning device comprising a pneumatic tube 16, which is arranged between it and the inner face of the rim 15. The outer rim 15 is fitted to the flanges 12 and 13 by being recessed into their inner faces, and should it be desired at any time to construct the wheel with a wider or narrower tire or tread it would be merely necessary to substitute a wider or narrower rim for the rim 15.

The various parts are secured together by means of bolts or screws 17, fitted to the flanges 12 and 13, and bolts or screws 18, engaging the spokes 11 and their removable portions 14.

An intermediate guide-plate 19 is arranged within the hub, between the hub portion 4 and the floating plate 10. The intermediate guide-plate has a sliding connection with the hub portion 4, and at right angles to such sliding connection has another sliding connection with the floating plate 10. This connection permits relative movement of the two wheel members in the plan of rotation of the wheel, but absolutely locks them against relatively rotary movement. In order to reduce the friction between the sliding faces of the intermediate guide-plate, hub, and floating plate, I have provided an antifriction-bearing, comprising a freely-mounted cylindrical sleeve 20, a relatively stationary stud 21, and a plurality of planetary rollers 22 between the stud 21 and the sleeve 20. Two of such bearings are arranged between the intermediate guide-plate and the central floating plate, the stationary studs 21 being secured to the intermediate guide-plate and the sleeve 20 being fitted within a longitudinal slot 23 in the central floating plate 10. The sleeves 20 are so fitted to the slot that when pressure is brought to bear thereon they will roll freely against either face, but will have substantially no movement transverse of the slot. The roller-bearings between the intermediate guide-plate and the hub portion 4 are arranged with their central studs 21 secured to the said hub portion and their sleeves 20 fitted between ribs 24, with which the rear face of the intermediate guide-plate is provided.

When the wheel is in operation, there is continuously a relative movement between the parts, and if power be applied through the wheels to drive a vehicle carried thereby considerable pressure will be brought to bear upon the slide-bearings. My improved antifriction-bearing will then prevent friction from interfering with the free movement desired and will further reduce wear to a minimum.

In referring to my improved antifriction-bearing I have referred to the portions 22 as "rollers." It will of course be understood that such rollers might be in spherical form, if so desired, such being a well-known substitute for a cylindrical roller of the form shown, and in referring to such devices as rollers it will be understood that I intend to include such substitute.

I do not desire to be limited to the exact construction and combination of parts herein shown, as the same is capable of many modifications within the spirit and scope of my invention. Furthermore, certain parts of my invention may be used with other parts of different construction, if desired.

What I claim is—

1. In a wheel, the combination with a hub member, a tire member, and a cushioning device between them, of an intermediate guide plate or member between the hub and tire members, one of said members provided with a plurality of stationary studs, and another having a slot arranged parallel with a line through the center of the said studs, of a plurality of freely-mounted sleeves, one for each said stationary stud, mounted upon the said studs, and arranged to engage the walls of the said slot.

2. In a wheel, the combination with a hub member, a tire member and a cushioning device between the members, of an intermediate guide plate or member between the hub and tire members, and roller-bearings comprising relatively stationary studs, freely-mounted sleeves, and planetary rollers between the sleeves and studs, said roller-bearings arranged between the intermediate guide-plate and the wheel members.

3. In a wheel, the combination with two relatively movable members, one provided with a plurality of stationary studs, and the other having a slot arranged parallel with a line passing through the center of the said studs, of a plurality of freely-mounted sleeves, one for each said stationary stud, and a plurality of planetary rollers arranged between the stationary studs and their respective sleeves.

4. In a wheel, the combination with a hub member, a tire member, and a cushioning device between them, of an intermediate guide plate or member between the hub and tire members, one of said members provided with a plurality of stationary studs, and another having a slot arranged parallel with a line through the center of the said studs, of a plurality of freely-mounted sleeves, one for each said stationary stud, and a plurality of planetary rollers arranged between the stationary studs and their respective sleeves.

5. In a wheel, the combination with a hub and spokes, of an outer channel comprising a rim and two flanges constructed separately, the flanges rigid with the said spokes and having recesses at their inner faces for receiving the edges of the said rim, together with bolts for securing the flanges and rim together.

6. In a wheel, the combination with a hub and spokes having removable portions, of an outer channel comprising a rim and two flanges constructed separately, one of said flanges rigid with the said spokes, the other said flanges rigid with removable portions of said spokes, and both said flanges having recesses for receiving the outer edges of the said rim, together with bolts for securing the flanges and removable portions of the spokes together.

7. A wheel comprising two relatively movable members and a cushioning device between them, one member comprising a hub, spokes and rim, the hub provided with a plurality of internally-screw-threaded bushings projecting radially therefrom, and the spokes provided with screw-threaded portions fitted to said bushings, substantially as set forth.

8. In a wheel, the combination with a hub member comprising a hub, spokes and a rim, a tire member, and a cushioning device between the members, the said hub composed of two sections having radially-projecting portions, and internally-screw-threaded bushings mounted in said portions, the said spokes having screw-threaded portions adapted to engage the said bushings, and means for locking the bushings in position.

PERCY A. SANGUINETTI.

Witnesses:
C. F. CARRINGTON,
M. M. CONOVER.

---

Correction in Letters Patent No. 754,504.

It is hereby certified that in Letters Patent No. 754,504, granted March 15, 1904, upon the application of Percy A. Sanguinetti, of New York, N. Y., for an improvement in "Vehicle-Wheels," an error appears in the printed specification requiring correction, as follows: In line 28, page 2, the word "plan" should read *plane;* and that the said Letters Patent should be read with this correction therein that the same may conform to the record of the case in the Patent Office.

Signed and sealed this 5th day of April, A. D., 1904.

[SEAL.]

F. I. ALLEN,
*Commissioner of Patents.*

6. In a wheel, the combination with a hub and spokes having removable portions, of an outer channel comprising a rim and two flanges constructed separately, one of said flanges rigid with the said spokes, the other said flanges rigid with removable portions of said spokes, and both said flanges having recesses for receiving the outer edges of the said rim, together with bolts for securing the flanges and removable portions of the spokes together.

7. A wheel comprising two relatively movable members and a cushioning device between them, one member comprising a hub, spokes and rim, the hub provided with a plurality of internally-screw-threaded bushings projecting radially therefrom, and the spokes provided with screw-threaded portions fitted to said bushings, substantially as set forth.

8. In a wheel, the combination with a hub member comprising a hub, spokes and a rim, a tire member, and a cushioning device between the members, the said hub composed of two sections having radially-projecting portions, and internally-screw-threaded bushings mounted in said portions, the said spokes having screw-threaded portions adapted to engage the said bushings, and means for locking the bushings in position.

PERCY A. SANGUINETTI.

Witnesses:
C. F. CARRINGTON,
M. M. CONOVER.

---

Correction in Letters Patent No. 754,504.

It is hereby certified that in Letters Patent No. 754,504, granted March 15, 1904, upon the application of Percy A. Sanguinetti, of New York, N. Y., for an improvement in "Vehicle-Wheels," an error appears in the printed specification requiring correction, as follows: In line 28, page 2, the word "plan" should read *plane;* and that the said Letters Patent should be read with this correction therein that the same may conform to the record of the case in the Patent Office.

Signed and sealed this 5th day of April, A. D., 1904.

[SEAL.]

F. I. ALLEN,
*Commissioner of Patents.*

It is hereby certified that in Letters Patent No. 754,504, granted March 15, 1904, upon the application of Percy A. Sanguinetti, of New York, N. Y., for an improvement in "Vehicle-Wheels," an error appears in the printed specification requiring correction, as follows: In line 28, page 2, the word "plan" should read *plane;* and that the said Letters Patent should be read with this correction therein, that the same may conform to the record of the case in the Patent Office.

Signed and sealed this 5th day of April, A. D., 1904.

[SEAL.]

F. I. ALLEN,
*Commissioner of Patents.*